(12) United States Patent
Pieczonka et al.

(10) Patent No.: US 12,366,537 B2
(45) Date of Patent: Jul. 22, 2025

(54) VEHICLE COOLANT SYSTEMS

(71) Applicant: GM GLOBAL TECHNOLOGY OPERATIONS LLC, Detroit, MI (US)

(72) Inventors: Nicholas Paul William Pieczonka, Windsor (CA); William Reginald Collin, Dearborn, MI (US); Thomas J. Chapaton, Sterling Heights, MI (US); Ratandeep Singh Kukreja, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 298 days.

(21) Appl. No.: 18/100,092

(22) Filed: Jan. 23, 2023

(65) Prior Publication Data

US 2024/0248044 A1 Jul. 25, 2024

(51) Int. Cl.
  *G01N 21/94* (2006.01)
  *F01P 11/06* (2006.01)
  *F01P 11/14* (2006.01)
  *G01N 21/53* (2006.01)
  *G01N 21/85* (2006.01)

(52) U.S. Cl.
  CPC .............. *G01N 21/94* (2013.01); *F01P 11/06* (2013.01); *F01P 11/14* (2013.01); *G01N 21/534* (2013.01); *G01N 21/85* (2013.01); *F01P 2011/065* (2013.01)

(58) Field of Classification Search
  CPC ...... F01P 11/06; F01P 11/14; F01P 2011/065; G01N 21/534; G01N 21/85; G01N 21/94; G01N 21/41; G01N 21/3577; B60H 1/32; B60H 1/00585; B60H 1/00878; B60H 1/00978
  See application file for complete search history.

(56) References Cited

U.S. PATENT DOCUMENTS 3,900,266 A * 8/1975 Takahashi .......... G01N 21/9027
356/442
2008/0237503 A1* 10/2008 Albertson .......... G01N 33/2847
250/564

FOREIGN PATENT DOCUMENTS

WO WO-0067000 A1 * 11/2000 ......... G01N 21/3577

* cited by examiner

*Primary Examiner* — Peter B Kim (57) ABSTRACT

A vehicle coolant system includes a pipe configured to facilitate a flow of vehicle coolant through the pipe, a light source configured to transmit at least one wavelength of light through the vehicle coolant, and a signal detector configured to receive at least one wavelength of light transmitted through the vehicle coolant, and to generate a signal intensity value corresponding to a measured intensity of the at least one wavelength of light received at the signal detector. A controller is configured to receive the signal intensity value from the signal detector, identify a coolant contamination threshold value corresponding to the vehicle coolant, compare the signal intensity value received from the signal detector to the coolant contamination threshold value, and initiate a vehicle coolant remedial action according to a result of comparing the signal intensity value received from the signal detector to the coolant contamination threshold value.

17 Claims, 5 Drawing Sheets

VEHICLE COOLANT SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle coolant systems, and more particularly, to detecting condensed aggregates in the coolant using a light source and signal detector.

SUMMARY

A vehicle coolant system includes a pipe of a vehicle, the pipe configured to facilitate a flow of vehicle coolant through the pipe, a light source configured to transmit at least one wavelength of light through the vehicle coolant in response to activation of the light source, a signal detector configured to receive at least one wavelength of light transmitted through the vehicle coolant, and to generate a signal intensity value corresponding to a measured intensity of the at least one wavelength of light received at the signal detector, and controller in communication with the light source and the signal detector. The controller is configured to activate the light source to generate transmission of the at least one wavelength of light, receive the signal intensity value from the signal detector after activating the light source, identify a coolant contamination threshold value corresponding to the vehicle coolant, compare the signal intensity value received from the signal detector to the coolant contamination threshold value, and initiate a vehicle coolant remedial action according to a result of comparing the signal intensity value received from the signal detector to the coolant contamination threshold value.

In other features, the vehicle coolant remedial action includes at least one of flushing the vehicle coolant from the vehicle, generating an alert indicating a contaminated coolant condition, and transmitting a report to a technician to request an inspection of the vehicle coolant.

In other features, the light source includes a laser diode configured to output a single wavelength of light.

In other features, the light source includes a laser diode configured to output multiple wavelengths of light.

In other features, the signal detector includes a photodiode.

In other features, the signal detector includes a two-dimensional array of signal detection elements.

In other features, the two-dimensional array of signal detection elements is configured to detect a change in an index of refraction of at least one wavelength of light.

In other features, the system includes at least one mirror configured to reflect the at least one wavelength of light, the at least one mirror in a path of the at least one wavelength of light between the light source and the signal detector.

In other features, the light source is configured to transmit at least one wavelength of light towards the signal detector in a direction parallel to a direction of the flow of vehicle coolant through the pipe.

In other features, the light source is configured to transmit at least one wavelength of light towards the signal detector in a direction perpendicular to a direction of the flow of vehicle coolant through the pipe.

In other features, the vehicle coolant comprises DEX-COOL coolant.

In other features, the controller is configured to store the signal intensity value received from the signal detector as a first signal intensity value at a first time, obtain a second signal intensity value from the signal detector at a second time subsequent to the first time, compare the second signal intensity value to the first signal intensity value to determine whether signal intensity is decreasing over time, and generate an alarm in response to a determination that a rate of change of the signal intensity exceeds a specified contamination rate of change value.

In other features, the pipe of the vehicle is connected with at least one of a heating, ventilation and air conditioning (HVAC) system of the vehicle, or a power electronics system.

In other features, the controller is configured to determine a glycol to water ratio according to the signal intensity value received from the signal detector.

A method for monitoring vehicle coolant includes activating, by a controller, a light source to transmit at least one wavelength of light through vehicle coolant, receiving, by the controller, a signal intensity value from a signal detector, the signal intensity value corresponding to a measured intensity of the at least one wavelength of light at a signal detector after the at least one wavelength of light passes through the vehicle coolant, identifying a coolant contamination threshold value corresponding to the vehicle coolant, comparing the signal intensity value received from the signal detector to the coolant contamination threshold value, and initiating a vehicle coolant remedial action according to a result of comparing the signal intensity value received from the signal detector to the coolant contamination threshold value.

In other features, the vehicle coolant remedial action includes at least one of flushing the vehicle coolant, generating an alert indicating a contaminated coolant condition, and transmitting a report to a technician to request an inspection of the vehicle coolant.

In other features, the light source is configured to transmit the at least one wavelength of light towards the signal detector in a direction parallel to a direction of a flow of the vehicle coolant through a pipe of a vehicle.

In other features, the light source is configured to transmit the at least one wavelength of light towards the signal detector in a direction perpendicular to a direction of a flow of the vehicle coolant through a pipe of a vehicle.

In other features, the signal detector includes at least one of a photodiode or a two-dimensional array of signal detection elements.

In other features, the method includes storing the signal intensity value received from the signal detector as a first signal intensity value at a first time, obtaining a second signal intensity value from the signal detector at a second time subsequent to the first time, comparing the second signal intensity value to the first signal intensity value to determine whether signal intensity is decreasing over time, and generating an alarm in response to a determination that a rate of change of signal intensity exceeds a specified contamination rate of change value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicle coolants, such as long life vehicle coolant fluids, are based on glycol and water mixtures with an additional corrosion inhibiter, such as the organic acid technology (OAT) packages present in DEX COOL® vehicle coolant. These OATs can interact with the presence of excess cations (e.g., Aluminum, Iron, Copper, Silicon, etc.) in the coolant, resulting in unwanted side reactions that generate insoluble products.

Aggregate growth in the vehicle coolant, and subsequent "dropping out" and deposition, results in gelling of the coolant that can hinder flow and occlude tubes (e.g., clog the vehicle coolant system). Excessive gelling may inhibit cabin thermal regulation, with potential heat loss and cooling system failure. As an example, gelling of coolant may result in loss of driver side duct and windshield defroster heating in some vehicles, such as larger trucks. Additionally, blown or leaking gaskets can cause coolant to become contaminated with other fluids, leading to potential coolant breakdown.

In some example embodiments described herein, an onset of unwanted aggregate generation and gelling of vehicle coolant may be detected using light scattering (e.g., a Tyndall effect). For example, a sensor may be located in-line with the vehicle coolant system, across the vehicle coolant system, etc. (such as across a pipe including a flow of vehicle coolant). Based on light interactions with aggregates in the coolant, the sensor may detect the onset of these products in the vehicle coolant before catastrophic clogging occurs.

As mentioned above, extended life vehicle coolant compositions, such as those based on glycol water mixtures with Organic Acid Technology (OAT) corrosion inhibitors, may breakdown over time and generate insoluble reaction products that can lead to gelling and compromising of the heating, venting and air conditioning (HVAC) system (or other vehicle systems that use coolant type fluids).

At present, there is no method to monitor the condition of coolant in the cooling system of a vehicle in real time with onboard vehicle diagnostics. In order to assess quality of coolant of a vehicle, samples may be removed from the system and analyzed via instrumentation in a laboratory setting. As there are many possible triggers to coolant gelling and breakdown during operation, routine testing may not detect any potential issues of the coolant of a particular vehicle.

In some example embodiments described herein, a sensor based on light scattering is added to a cooling system to allow monitoring of coolant health in real time during vehicle operation, or the sensor may be used separately during a service visit to allow real time monitoring of the vehicle coolant during a service visit. The capability to assess a coolant's condition and detect its degradation/contamination at an early stage, may facilitate determining when coolant is becoming compromised to allow remedial action before catastrophic clogging and HVAC system (or other suitable system) failure occurs.

Some example advantages of using a sensor based on light scattering within the cooling system of a vehicle, include facilitating real time assessment of quality of the coolant of the vehicle. The ability to catch the onset of vehicle coolant issues, such as gelling, allows for corrective actions to be implemented in time to avoid cooling system failures (e.g., HVAC failure) and driver dissatisfaction.

In various implementations, a sensor based on light scattering may detect insoluble contaminates in vehicle coolant, and a breakdown level of the vehicle coolant. For example, the current quality of the coolant may be determined based on interaction of light with the coolant as the light is transmitted through the coolant and detected at a sensor.

The output of the sensor may be used to determine corrective actions, such as servicing the vehicle, changing the coolant, etc. For example, a level of signal intensity of light passing through the coolant, an amount of light scattering, etc., may be compared to one or more thresholds, scales, etc., to determine a level of aggregates in the coolant, an amount of gelling of the coolant, etc.

In various implementations, a glycol concentration may be determined using the light scattering, light intensity, etc. in situ, to estimate coolant lifetime. Contamination in coolants from various sources may be determined, including gelling, oil contamination, etc. In some example embodiments, accuracy of detection may be improved by increasing the interaction path length of a laser in a sample chamber (such as by using one or more mirrors to reflect the light and increase the length of a path between the light source and the signal detector). This may increase a signal to noise ratio of the light source and the signal detector apparatus.

Use of the light source and signal detector may allow for detection of unwanted side reactions and coolant contamination, which if left unchecked could lead to gelling and hinder the function of interior cabin temperature regulation (or failure of any other suitable vehicle systems using coolant type fluids). The light source and signal detector may be used to detect deleterious mixing of engine/transmission oils and vehicle coolant.

As an example comparison, in a clean coolant scenario the light from the light source may pass through the coolant with little to no attenuation, where received signal intensity at a signal detector on the other side of the coolant pipe is at or near a maximum value. In contrast, in a system with contaminated coolant, the light from the light source is scattered by contaminants in the coolant, and the intensity of the signal reaching the signal detector is reduced. Detected signal intensities which are less than or equal to a limit, threshold, etc., may be used to set a warning light and trigger remediation.

Example systems could be used to detect presence of any contaminants that corrupt the integrity of coolant. For example, higher efficiency designs for some more recent vehicle heating and cooling systems create smaller openings for the coolant, which leads to more clogging, a higher surface area can cause more product reactions, etc.

In various implementations, small insoluble particles (such as particles at a small ppm level), may cause catastrophic clogging, leading to failure of a heating system in the vehicle. Any suitable light source may be used to detect the contaminants (even down to low ppm levels), such as a white light source, a multi-wave light source, a single wavelength light source, etc. The signal detector may be configured to detect scattering of the light after passing through the coolant, a signal intensity of the light after passing through the coolant, etc.

The light source and signal detector apparatus may be used in any suitable vehicle system that uses coolant type fluid, such as HVAC systems, power electronics (which may be a leading area of gasket failure), etc., to detect leaking of oil or gas into the coolant, to detect formation of white powdery substance from oxidation, etc. In various implementations, a ratio of glycol to water may indicate a freezing point or temperature point of the coolant, and the ratio may be detected by the light source and sensor apparatus. In some example embodiments, the sensor may detect a refractive index of the light, to see how the beam is changed or bent as it passes through the coolant.

The sensor may include any suitable signal detector element, such as a photodiode. The photodiode may provide a signal intensity, such as a single voltage output (e.g., light in versus light out) relative to a clean coolant maximum signal intensity.

The signal detector may have a spatial effect based on pixels, such as a spatial dispersion of the light after passing through the coolant. The sensor may detect a size of material, type of material, shape of material, etc., present in the coolant. For example, a two-dimensional array of signal detector elements may be used as a sensor. Some signal detector elements may detect a shape of aggregates in the coolant, some signal detector elements may detect a position of aggregates in the coolant, etc.

Single element signal detectors, multi-element signal detectors, etc., may be used as desired in consideration of simplicity, a need for additional light sensing information, etc., in a given application. For example, a two-dimensional array of signal detectors in the x-axis and y-axis directions could be used to detect a change in an index of refraction of the light as it passes through the coolant.

As mentioned above, the light from the light source may include multiple wavelengths (such as white light), may be a single wavelength selected for specificity, may be include multiple individual wavelengths or wavelength ranges selected for multiple properties of the coolant, etc. The light wavelength(s) may be selected to avoid fluorescence that could mask the signal, while still allowing the sensor to detect scattering. For example, DEX COOL coolant may contain one or more dye packages, to provide red color, orange color, etc.

In various implementations, the detected light intensity after passing through the coolant may be compared to a threshold value, in order to check the life or health of the coolant. This may be similar to, e.g., oil monitoring that alerts a driver to a current state of the vehicle oil. The system may generate an alarm or notification to the driver if the coolant life is below a threshold, if a specified amount of coolant contamination is detected, etc.

In some example embodiments, information about detected coolant health could be included in onboard diagnostics of the vehicle, such as on a display to the driver or a vehicle technician. The coolant light scattering detection could be performed offline, such as using a similar light source and signal detector on a sample removed from the vehicle at a service center. More than one method could be used to cross-check any determined coolant issues. In various implementations, detection of coolant issues could be transmitted to an application on a driver's mobile phone, to a driver account online (such as a cloud server or driver monitoring website), etc.

The system may monitor a rate of change of the coolant health over time to determine if a coolant problem is getting worse, which could lead to a loss of heat, etc., once the concentration of aggregates in the coolant reaches a critical point that could block flow of the coolant in the system.

The signal detector may be placed in any suitable location relative to the light source. For example, the signal detector may be placed on an opposite side of the coolant directly across from the light source, such that the light is transmitted directly through the coolant to the signal detector.

In other example embodiments, one or more mirrors may be used to reflect the light one or more times though the coolant, to improve sensitivity of the light scattering detection. For example, using a mirror may increase a path length of the light from the light source to the signal detector, which allows the light to pass though more media, providing more diffraction and scattering and a larger change in the intensity of the light signal for a same concentration of aggregates in the coolant.

In various implementations, the signal detector may be placed on a same side of the coolant as the light source with a single mirror reflecting the light so that it passes through the coolant twice. In another example embodiment, the signal detector may be placed on an opposite side of the coolant as the light source, with two mirror used to cause the light to pass through the coolant three times, and so on.

Figure 1:
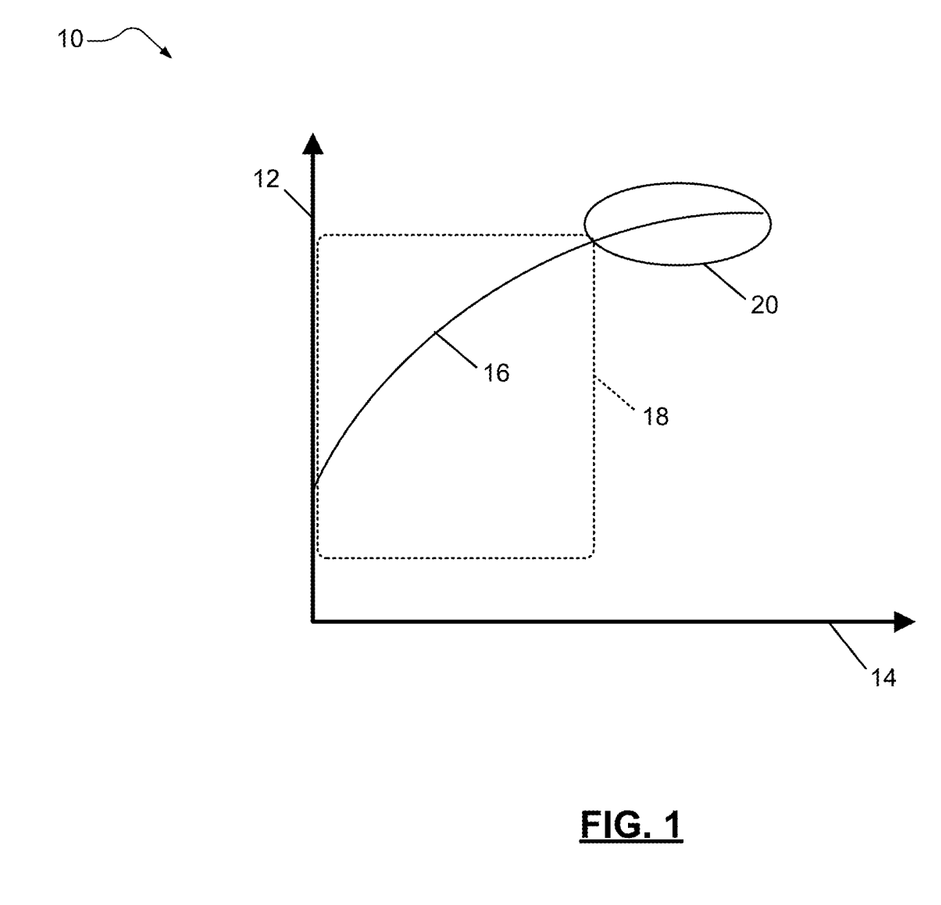
FIG. 1 is a plot illustrating an example increase in vehicle coolant aggregate size and concentration over time.

FIG. 1 is a plot 10 illustrating an example increase in vehicle coolant aggregate size and concentration over time. The y-axis is an aggregate size and concentration 12 of the vehicle coolant, and the x-axis is a time 14, such as a lifetime of the vehicle.

The aggregate size and concentration 12 of the vehicle coolant may increase over time, such as due to OAT inhibitors creating unwanted side product reactions over time, gelling of the coolant occurring, contaminants of the vehicle entering the coolant over time, etc. The trendline 16 illustrates how the aggregate size and concentration 12 increases over the lifetime of the vehicle in this example.

As shown in FIG. 1, the solution section 18 illustrates a portion of the coolant lifetime where the aggregate size and concentration 12 of the coolant is within an acceptable level that is unlikely to cause clogging of the vehicle coolant system. For example, any reaction side products, aggregates, etc. may be small enough to be considered as still in the coolant solution, and not large enough to clog the pipes of the vehicle coolant system, etc.

At clog section 20 in FIG. 1, the aggregate size and concentration 12 of the vehicle coolant has reached a level where catastrophic clogging of the vehicle system may occur (or may be likely to occur). For example, the size of aggregate particles in the coolant, the number of aggregate particles in the coolant, etc., may be at a level where they are likely to clog an orifice of the vehicle coolant system.

A threshold where the aggregate size and concentration 12 transitions from the solution section 18 indicative of a low likelihood of system clogging, to the clog section 20 indicative of a possible catastrophic clogging condition of the system, may be specified, determined, etc., based on any suitable approach. For example, experiments may be conducted to determine what level of aggregate size and concentration 12 causes clogging in a model vehicle coolant system. Different thresholds may be specified for different systems, different types of coolant, etc.

Figure 2A:
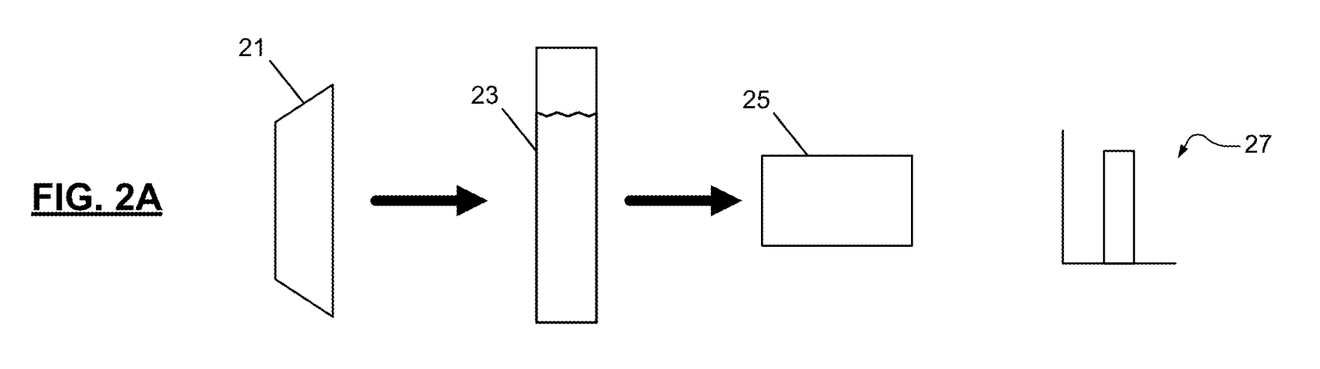
FIG. 2A is a sequence diagram of an example light source and signal detector measuring signal intensity for vehicle coolant without large aggregates.

FIG. 2A is a sequence diagram of an example light source and signal detector measuring signal intensity for vehicle coolant without large aggregates. As shown in FIG. 2A, the light source 21 transmits a light through the vehicle coolant 23. The light source 21 may be any suitable light source, such as a light bulb, a light-emitting diode (LED), a laser diode, etc.

The light transmitted through the vehicle coolant may be any suitable light, such as a single wavelength light, a multi-wavelength light including individual wavelengths or wavelength ranges specified to various properties of the coolant (such as avoiding fluorescents added to the coolant), a white light, etc.

The vehicle coolant 23 may be in a pipe or other component of a coolant system of the vehicle. For example, the light source 21 may be configured to transmit light through a transparent or open portion of a pipe of the coolant system of the vehicle, in order to monitor coolant health in real time during operation of the vehicle. In other example embodiments, a sample of vehicle coolant may be removed from the vehicle and placed in a device including the light source 21 and the signal detector 25, etc.

The signal detector 25 is configured to receive the light after it passes through the vehicle coolant 23, and output a signal intensity 27. The signal intensity 27 may be indicative of a strength of the light that passed through the vehicle coolant 23. For example, if the coolant does not have much aggregate, the light may not be scattered, and the full amount of light transmitted by the light source 21 (or near full amount) may be received at the signal detector 25 after passing through the vehicle coolant 23.

The signal detector 25 may be any suitable signal detector, such as a photodiode. In some example embodiments, the signal detector 25 may include multiple detection elements, such as a two-dimensional array of signal detector elements that can detect multiple properties of the light received from the vehicle coolant 23 (such as spatial information of the light scattering, a refractive index of the light, etc.).

Figure 2B:
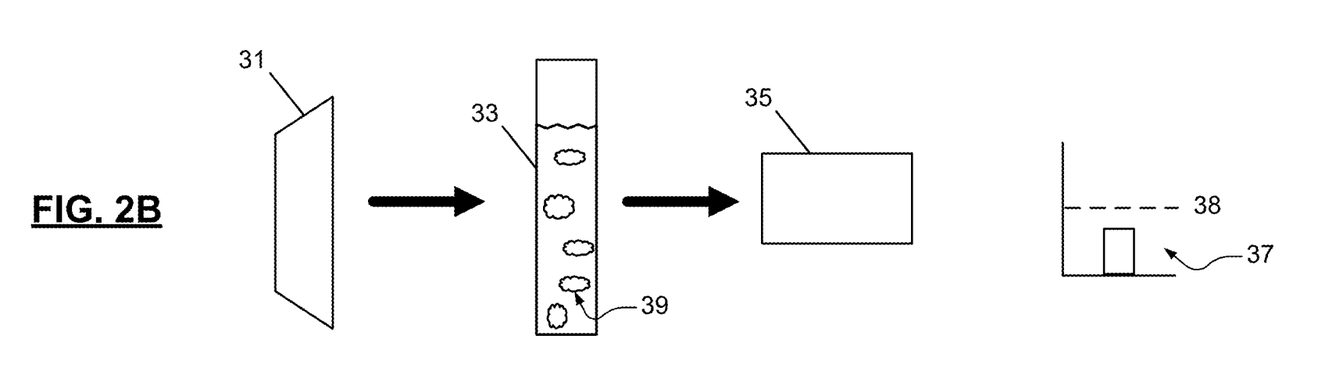
FIG. 2B is a sequence diagram of an example light source and signal detector measuring signal intensity for vehicle coolant including large aggregates.

FIG. 2B is a sequence diagram of an example light source and signal detector measuring signal intensity for vehicle coolant including large aggregates. FIG. 2B may be similar to FIG. 2A, but the vehicle coolant 33 includes multiple aggregate particles 39 (and therefore is more contaminated than the vehicle coolant 23 of FIG. 2A).

As shown in FIG. 2B, the light source 31 transmits light though the vehicle coolant 33 to the signal detector 35. A portion of the light that is transmitted through the vehicle coolant 33 is scattered by the aggregate particles 39 prior to reaching the signal detector.

The light scattering of the aggregate particles 39 causes that signal intensity 37 detected by the signal detector 35 to be lower compared to the example of FIG. 2A that included clean coolant. For example, the signal intensity 37 received at the signal detector 35 may be significantly lower than the intensity of the initial signal transmitted by the light source 31 (e.g., due to scattering by the aggregate particles 39).

The lower value of the signal intensity 37 output by the signal detector 35 in the example of FIG. 2B may be used to identify contamination of the vehicle coolant 33. For example, if the signal intensity 37 is below a specified threshold 38, the system may determine that the vehicle coolant 33 includes too many aggregate particles 39, and therefore remedial action is recommended to avoid catastrophic clogging of the vehicle coolant system, etc.

Figure 3:
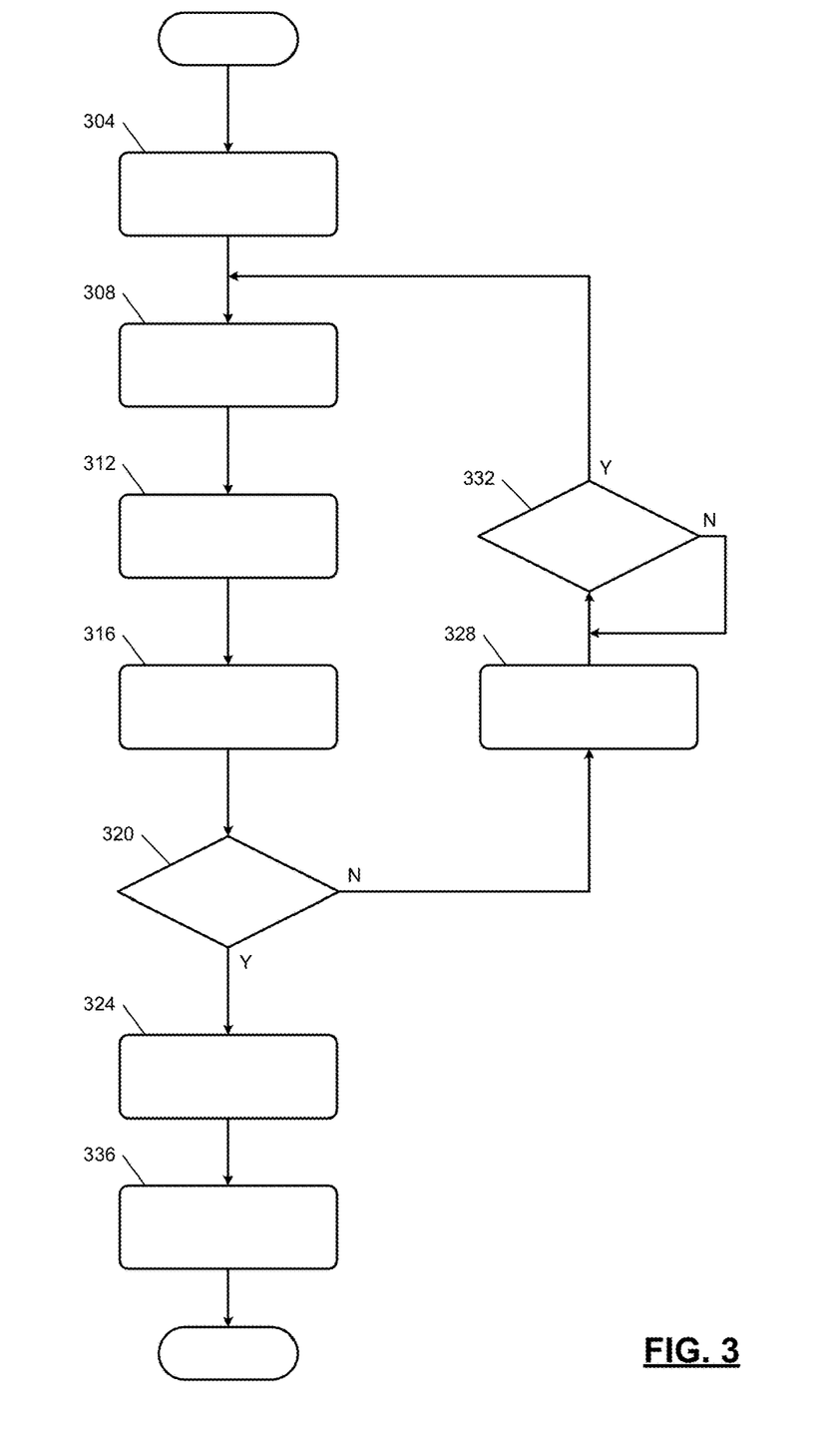
FIG. 3 is a flowchart depicting an example process for analyzing vehicle coolant using a light source and signal detector.

FIG. 3 is a flowchart depicting an example process for analyzing vehicle coolant using a light source and signal detector. The process may be performed by any suitable controller, such as the example controller 72 described further below and illustrated in FIG. 5. For example, the controller 72 may execute computer-executable instructions 73 that specify one or more of the steps illustrated in the example process of FIG. 3.

At 304, the controller is configured to identify a coolant type and/or signal detector location in the system. For example, the controller may identify a type of coolant used in a vehicle coolant system, in order to determine what signal intensities should be expected to be detected, what thresholds should be used to determine when aggregate particle sizes are too large, etc.

The controller may determine a location of the signal detector in order to determine what signal intensities should be expected to be detected, what thresholds should be used to determine when aggregate particle sizes are too large, etc. For example, the controller may determine whether a light signal travels directly through the vehicle coolant from the light source to the signal detector, whether one or more mirrors are used to increase a path that the light travels between the light source and the signal detector, etc.

Although FIG. 3 illustrates identifying a type of coolant and/or a signal detector location at 304, it should be appreciated that in other embodiments the controller may be specifically programmed for a type of coolant or signal detector location used in the vehicle coolant system, such that the system does not need to perform an explicit step of identifying a coolant type or signal detector location. In various implementations, the controller reading a preprogrammed threshold value, etc., may be considered as identifying a coolant type and/or signal detector location (e.g., where the threshold corresponds to a coolant type or signal detector location).

At 308, the controller is configured to activate the light source to transmit light through the coolant. For example, the controller may be configured to periodically check the coolant health (such as every minute, every hour, every day, every week, etc.), where the controller turns on the light source in order to detect light transmission through the coolant.

The controller is configured to detect an intensity of the light signal passing through the coolant at 312. For example, the controller may receive an intensity value from a signal detector, corresponding to an intensity of the light signal sensed at the signal detector, after any light scattering by the vehicle coolant.

At 316, the controller obtains an aggregate intensity threshold value. For example, one or more thresholds may be specified (such as based on experimental tests, etc.), which identify a signal intensity threshold at which particle aggregates in the coolant may have reached a point likely to cause clogging of the vehicle coolant system. If there are too many particle aggregates in the coolant, the light scattering by the coolant may cause the signal intensity reaching the signal detector to drop below the threshold value.

If the controller determines at 320 that the detected intensity is not below the threshold, the controller is configured to proceed to 328 to deactivate the light source. The controller then waits at 332 until a detection period has elapsed, before returning to 308 to activate the light source again to transmit the light though the coolant for a next detection. For example, as mentioned above, the controller may be configured to periodically check the coolant health every minute, every hour, every day, every week, etc.

If the controller determines at 320 that the detected intensity is less than the threshold value, the controller is configured to proceed to 324 to generate a coolant aggregate alert. The alert may transmit a warning message to the driver, display a message on an interface of the vehicle, transmit a warning to a service center associated with the vehicle, etc.

At 336, the controller initiates a flush of the contaminated coolant from the system. For example, the controller may generate a message indicating that the coolant should be flushed to a driver or technician, the controller may open a drain value of the coolant system, the controller may inhibit normal operation of the vehicle coolant system until the vehicle coolant is flushed, etc.

Although FIG. 3 illustrates generating an alert at 324, and flushing the coolant at 336, it should be appreciated that any suitable remedial action (including generating an alert, flushing the coolant, etc.) may be performed by the controller or another entity, in response to a determination at 320 that the detected intensity has fallen below the threshold.

In various implementations, the controller may be configured to determine whether the signal intensity is changing over time. For example, the controller may store a first signal intensity value received from the signal detector at a first time, and after a specified time period has elapsed, store a second signal intensity received from the signal detector at a second time. The controller may then determine whether the second signal intensity value is reduced compared to the first signal intensity value.

Figure 4A:
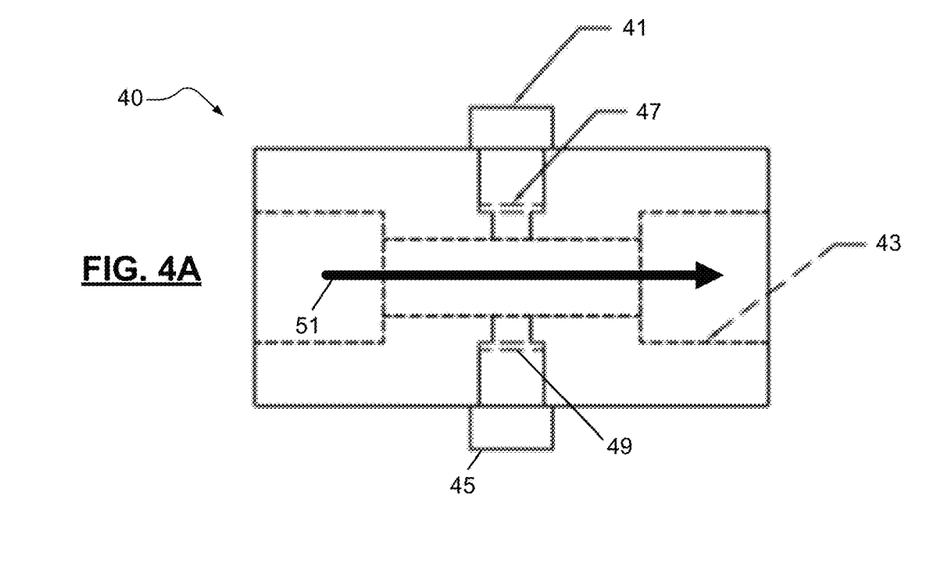
FIG. 4A is a top cross-sectional view of an example vehicle coolant monitoring device including a light source and a signal detector.

FIG. 4A is a top cross-sectional view of an example vehicle coolant monitoring device 40 including a light source 41 and a signal detector 45. As shown in FIG. 4A, a pipe 43 is tapped to allow light access for the vehicle coolant monitoring device. The coolant 51 flows through the pipe 43, while the light source 41 and signal detector 45 are arrange substantially perpendicular to the flow of the coolant 51 through the pipe 43.

The pipe 43 may be modified in any suitable manner to allow the light source 41 to transmit light through the coolant 51. For example, a hole, channel, etc. may be drilled though to the sidewalls of the pipe 43, with a transparent glass window 47 used to permit light from the light source 41 to be transmitted though the coolant 51 while inhibiting the coolant 51 from exiting the pipe 43.

Similarly, another transparent glass window may be used to allow light to exit the coolant 51 to the signal detector 45, while inhibiting the coolant 51 from exiting the pipe through the glass window. In this example, the vehicle coolant monitoring device 40 may allow for monitoring of the coolant 51 in real time, while the coolant is still being used in a normal operating manner in a coolant system of the vehicle. The configuration of FIG. 4A illustrates the light being transmitted across the coolant 51 and pipe 43, in a direction substantially perpendicular to the direction of flow of the coolant 51.

In various implementations, one or more mirrors 49 may be used to reflect the light transmitted by the light source 41, to increase a path length that the light travels between the light source 41 and the signal detector 45 (e.g., to improve an accuracy of the signal intensity detection, etc.). For example, mirrors 49 may be placed at each side of the pipe 43 to reflect the light back and forth though the coolant 51 multiple times before reaching the signal detector 45.

Figure 4B:
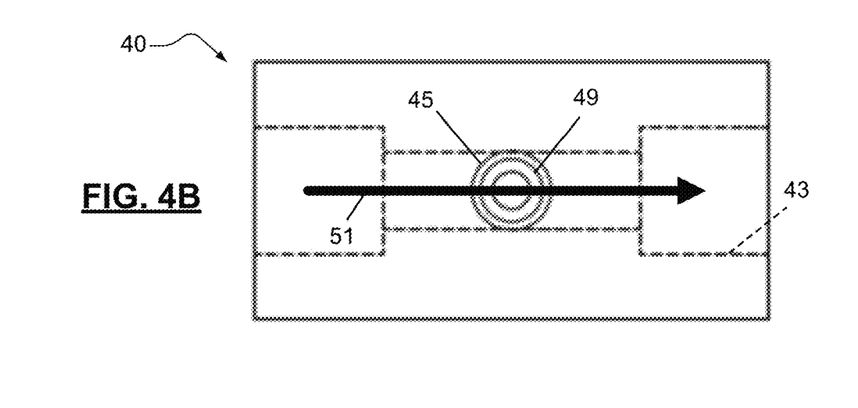
FIG. 4B is a front cross-sectional view of the example vehicle coolant monitoring device of FIG. 4A.

FIG. 4B is a front cross-sectional view of the example vehicle coolant monitoring device 40 of FIG. 4A. As shown in FIG. 4B, the coolant 51 flows through the pipe 43 in a first direction, and the signal detector 45 and mirror 49 are arranged perpendicular to the direction of flow of the coolant 51.

Figure 4C:
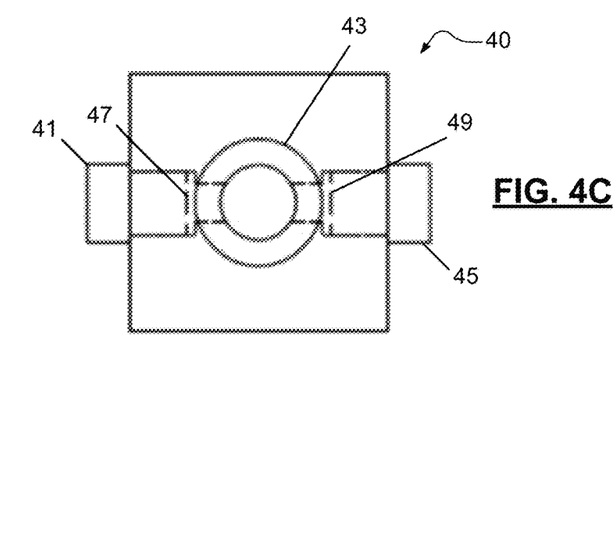
FIG. 4C is a side cross-sectional view of the example vehicle coolant monitoring device of FIG. 4A.

FIG. 4C is a side cross-sectional view of the example vehicle coolant monitoring device 40 of FIG. 4A. As shown in FIG. 4C, the light source 41, the signal detector 45, the transparent glass window 47 and the mirrors 49 are arranged in a direction substantially perpendicular to the pipe 43 and the direction of flow of the coolant 51.

Figure 5:
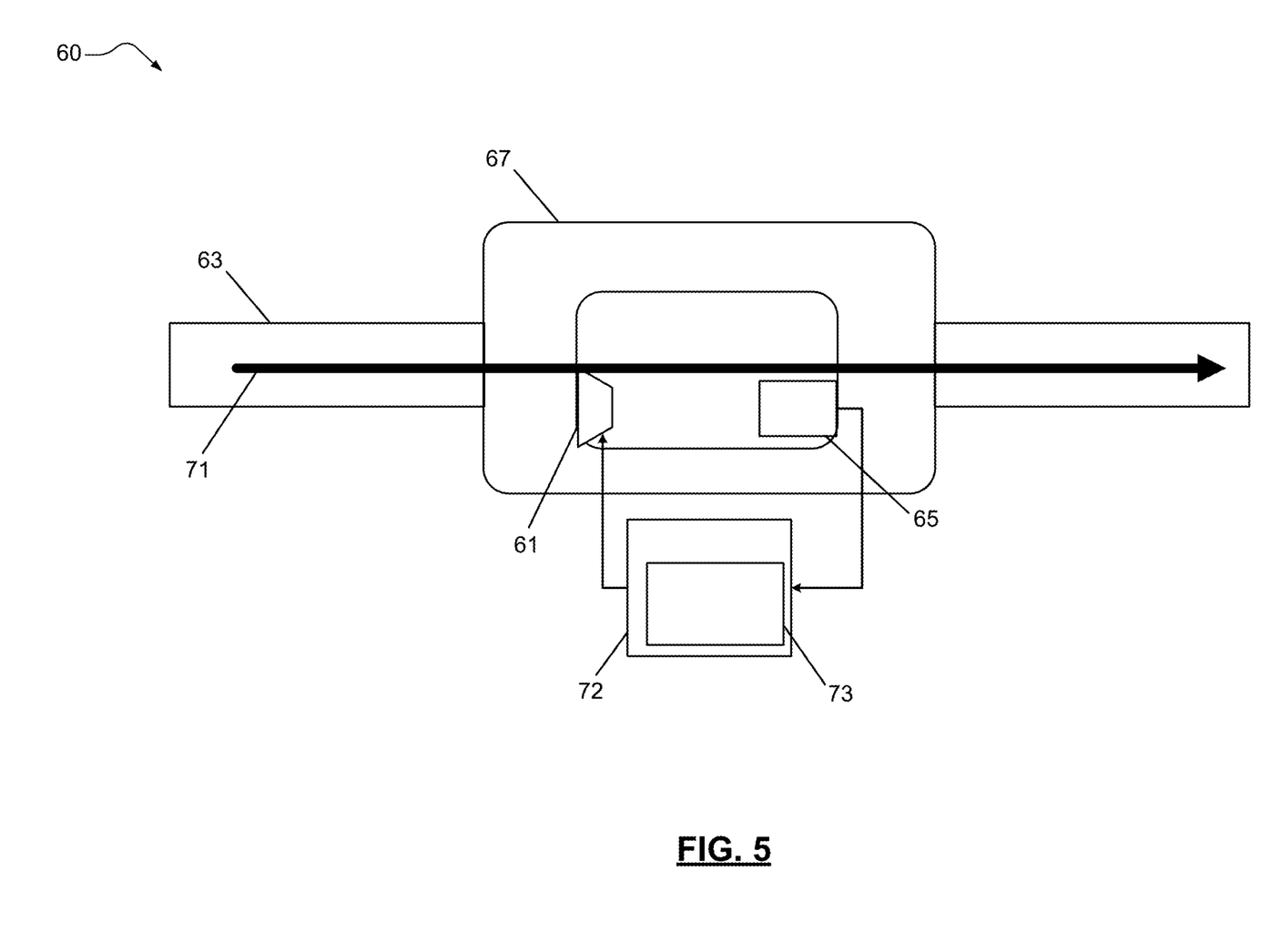
FIG. 5 is a cross-sectional view of another example vehicle coolant monitoring device including a light source and signal detector oriented in a flow direction of the vehicle coolant.

FIG. 5 is a cross-sectional view of another example vehicle coolant monitoring device 60 including a light source 61 and signal detector 65 oriented in a flow direction of the vehicle coolant 71. For example, while FIG. 4 illustrates light being transmitted perpendicular to a flow direction of the coolant, FIG. 5 illustrates another example embodiment where the light is transmitted in a direction that is substantially parallel to the direction of flow of the vehicle coolant 71 through the pipe 63.

As shown in FIG. 5, a housing 67 may be introduced in-line with the pipe 63 of the vehicle coolant system, in order to monitor health of the vehicle coolant. The housing 67 includes a light source 61 and a signal detector 65. The light source 61 is configured to transmit light through the vehicle coolant 71 to the signal detector 65. For example, each of the light source 61 and the signal detector 65 may include a transparent cover, window, etc. that inhibits the coolant from entering the light source 61 or the signal detector 65, while permitting light to travel from the light source 61 to the signal detector 65.

The vehicle coolant monitoring device 60 includes a controller 72 coupled between the light source 61 and the signal detector 65. The controller 72 is configured to activate the light source 61 and receive a signal intensity reading from the signal detector 65. The controller 72 may then determine whether the received signal intensity is less than a specified threshold, where remedial action is recommended.

For example, the controller 72 may execute computer-executable instructions 73, where the computer-executable instructions 73 are stored in a memory associated with the controller 72, are read from another memory separate from the controller 72, etc. The computer-executable instructions 73 may include an example process similar to the process illustrated in FIG. 3 as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:
1. A vehicle coolant system comprising:
 a pipe of a vehicle, the pipe configured to facilitate a flow of vehicle coolant through the pipe;

a light source configured to transmit at least one wavelength of light through the vehicle coolant in response to activation of the light source;
a signal detector configured to receive at least one wavelength of light transmitted through the vehicle coolant, and to generate a signal intensity value corresponding to a measured intensity of the at least one wavelength of light received at the signal detector; and
a controller in communication with the light source and the signal detector, the controller configured to:
activate the light source to generate transmission of the at least one wavelength of light;
receive the signal intensity value from the signal detector after activating the light source;
identify a coolant contamination threshold value corresponding to the vehicle coolant;
compare the signal intensity value received from the signal detector to the coolant contamination threshold value;
initiate a vehicle coolant remedial action according to a result of comparing the signal intensity value received from the signal detector to the coolant contamination threshold value;
store the signal intensity value received from the signal detector as a first signal intensity value at a first time;
obtain a second signal intensity value from the signal detector at a second time subsequent to the first time;
compare the second signal intensity value to the first signal intensity value to determine whether signal intensity is decreasing over time; and
generate an alarm in response to a determination that a rate of change of the signal intensity exceeds a specified contamination rate of change value.

2. The vehicle coolant system of claim 1, wherein the vehicle coolant remedial action includes at least one of flushing the vehicle coolant from the vehicle, generating an alert indicating a contaminated coolant condition, and transmitting a report to a technician to request an inspection of the vehicle coolant.

3. The vehicle coolant system of claim 1, wherein the light source includes a laser diode configured to output a single wavelength of light.

4. The vehicle coolant system of claim 1, wherein the light source includes a laser diode configured to output multiple wavelengths of light.

5. The vehicle coolant system of claim 1, wherein the signal detector includes a photodiode.

6. The vehicle coolant system of claim 1, wherein the signal detector includes a two-dimensional array of signal detection elements.

7. The vehicle coolant system of claim 6, wherein the two-dimensional array of signal detection elements is configured to detect a change in an index of refraction of at least one wavelength of light.

8. The vehicle coolant system of claim 1, further comprising at least one mirror configured to reflect the at least one wavelength of light, the at least one mirror in a path of the at least one wavelength of light between the light source and the signal detector.

9. The vehicle coolant system of claim 1, wherein the light source is configured to transmit at least one wavelength of light towards the signal detector in a direction perpendicular to a direction of the flow of vehicle coolant through the pipe.

10. The vehicle coolant system of claim 1, wherein the pipe of the vehicle is connected with at least one of a heating, ventilation and air conditioning (HVAC) system of the vehicle, or a power electronics system.

11. The vehicle coolant system of claim 1, wherein the controller is configured to determine a glycol to water ratio according to the signal intensity value received from the signal detector.

12. A vehicle coolant system comprising:
a pipe of a vehicle, the pipe configured to facilitate a flow of vehicle coolant through the pipe;
a light source configured to transmit at least one wavelength of light through the vehicle coolant in response to activation of the light source;
a signal detector configured to receive at least one wavelength of light transmitted through the vehicle coolant, and to generate a signal intensity value corresponding to a measured intensity of the at least one wavelength of light received at the signal detector, wherein the light source is configured to transmit at least one wavelength of light towards the signal detector in a direction parallel to a direction of the flow of vehicle coolant through the pipe; and
a controller in communication with the light source and the signal detector, the controller configured to:
activate the light source to generate transmission of the at least one wavelength of light;
receive the signal intensity value from the signal detector after activating the light source;
identify a coolant contamination threshold value corresponding to the vehicle coolant;
compare the signal intensity value received from the signal detector to the coolant contamination threshold value; and
initiate a vehicle coolant remedial action according to a result of comparing the signal intensity value received from the signal detector to the coolant contamination threshold value.

13. A method for monitoring vehicle coolant, the method comprising:
activating, by a controller, a light source to transmit at least one wavelength of light through vehicle coolant;
receiving, by the controller, a signal intensity value from a signal detector, the signal intensity value corresponding to a measured intensity of the at least one wavelength of light at a signal detector after the at least one wavelength of light passes through the vehicle coolant;
identifying a coolant contamination threshold value corresponding to the vehicle coolant;
comparing the signal intensity value received from the signal detector to the coolant contamination threshold value;
initiating a vehicle coolant remedial action according to a result of comparing the signal intensity value received from the signal detector to the coolant contamination threshold value;
storing the signal intensity value received from the signal detector as a first signal intensity value at a first time;
obtaining a second signal intensity value from the signal detector at a second time subsequent to the first time;
comparing the second signal intensity value to the first signal intensity value to determine whether signal intensity is decreasing over time; and
generating an alarm in response to a determination that a rate of change of the signal intensity exceeds a specified contamination rate of change value.

14. The method of claim 13, wherein the vehicle coolant remedial action includes at least one of flushing the vehicle coolant, generating an alert indicating a contaminated coolant condition, and transmitting a report to a technician to request an inspection of the vehicle coolant.

15. The method of claim 13, wherein the light source is configured to transmit the at least one wavelength of light towards the signal detector in a direction parallel to a direction of a flow of the vehicle coolant through a pipe of a vehicle.

16. The method of claim 13, wherein the light source is configured to transmit the at least one wavelength of light towards the signal detector in a direction perpendicular to a direction of a flow of the vehicle coolant through a pipe of a vehicle.

17. The method of claim 13, wherein the signal detector includes at least one of a photodiode or a two-dimensional array of signal detection elements.

\* \* \* \* \*